(12) United States Patent
Kim

(10) Patent No.: US 12,543,119 B2
(45) Date of Patent: Feb. 3, 2026

(54) ELECTRONIC DEVICE AND METHOD FOR IMPROVING THERMAL PERFORMANCE THEREOF

(71) Applicant: SAMSUNG ELECTRONICS CO., LTD., Suwon-si (KR)

(72) Inventor: Youngsan Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 611 days.

(21) Appl. No.: 17/983,403

(22) Filed: Nov. 9, 2022

(65) Prior Publication Data

US 2023/0103900 A1  Apr. 6, 2023

Related U.S. Application Data

(63) Continuation of application No. PCT/KR2022/015042, filed on Oct. 6, 2022.

(30) Foreign Application Priority Data

Oct. 6, 2021  (KR) .................. 10-2021-0132177

(51) Int. Cl.
*H04W 76/19*  (2018.01)
*G01K 7/22*  (2006.01)
(Continued)

(52) U.S. Cl.
CPC .......... *H04W 52/0261* (2013.01); *G01K 7/22* (2013.01); *G01R 19/10* (2013.01); *H04W 76/15* (2018.02); *H04W 76/19* (2018.02); *H04W 88/06* (2013.01)

(58) Field of Classification Search
CPC . H04W 52/00; H04W 52/0261; H04W 76/19; H04W 76/15; H04W 88/06; G01K 7/22
See application file for complete search history.

(56) References Cited

U.S. PATENT DOCUMENTS 8,890,921 B2  11/2014 Rawat et al.
10,880,805 B2  12/2020 Jia
(Continued)

FOREIGN PATENT DOCUMENTS

CN  110831096 A  2/2020
CN  113015226 A  6/2021
(Continued)

OTHER PUBLICATIONS

International Search Report mailed Jan. 13, 2023 for PCT/KR2022/015042.
(Continued)

*Primary Examiner* — Jinsong Hu
*Assistant Examiner* — Farideh Madani
(74) *Attorney, Agent, or Firm* — CANTOR COLBURN LLP

(57) ABSTRACT

A thermal control method of an electronic device includes: measuring a temperature of the electronic device in a first state connected to a first cellular network; identifying a first current consumed through a communication module in the first state; establishing connection to a second cellular network in case that the measured temperature exceeds a reference value; identifying a second current consumed through the communication module in a second state connected to the second cellular network; comparing a first communication environment of the first cellular network with a second communication environment of the second cellular network in case that the first current is less than the second current; and maintaining the connection to the second cellular network or reestablishing connection to the first cellular network, based on comparison of the first communication environment with the second communication environment or whether the second current is less than the first current.

17 Claims, 7 Drawing Sheets

(51) Int. Cl.
*G01R 19/10* (2006.01)
*H04W 52/02* (2009.01)
*H04W 76/15* (2018.01)
*H04W 88/06* (2009.01)

(56) References Cited

U.S. PATENT DOCUMENTS

| | | | |
|---|---|---|---|
| 11,089,521 | B2 | 8/2021 | Yuan et al. |
| 2018/0007575 | A1* | 1/2018 | Singhal ................ H04W 76/15 |
| 2018/0359689 | A1 | 12/2018 | Lee et al. |
| 2019/0069205 | A1* | 2/2019 | Lee ...................... H04W 48/20 |
| 2019/0166536 | A1 | 5/2019 | Kim et al. |
| 2020/0323032 | A1 | 10/2020 | Kim et al. |
| 2020/0367176 | A1 | 11/2020 | Lee et al. |
| 2020/0383044 | A1 | 12/2020 | Lee et al. |
| 2021/0119748 | A1* | 4/2021 | Damnjanovic ..... H04W 52/146 |
| 2021/0136194 | A1* | 5/2021 | Wang ................ H04M 1/72463 |
| 2021/0195439 | A1 | 6/2021 | Prabhakar et al. |
| 2023/0024741 | A1 | 1/2023 | Luo et al. |

FOREIGN PATENT DOCUMENTS

| | | | |
|---|---|---|---|
| EP | 3825814 A1 | 5/2021 | |
| JP | 2015-065569 A | 4/2015 | |
| KR | 10-2020-0006077 A | 1/2020 | |
| KR | 20200117847 A | 10/2020 | |
| KR | 10-2020-0132161 A | 11/2020 | |
| KR | 10-2022-0129895 A | 9/2022 | |
| WO | WO-2019103527 A1 * | 5/2019 | ............ H04W 36/24 |
| WO | 2020199228 A1 | 10/2020 | |
| WO | 2021/045274 A1 | 3/2021 | |
| WO | 2021115030 A1 | 6/2021 | |
| WO | 2021126798 A1 | 6/2021 | |

OTHER PUBLICATIONS

The extended European search report for EP Application No. 22878916.0 mailed on Oct. 31, 2024.

* cited by examiner

ELECTRONIC DEVICE AND METHOD FOR IMPROVING THERMAL PERFORMANCE THEREOF

TECHNICAL FIELD

The disclosure relates to an electronic device and, for example, to a method for improving thermal performance of an electronic device capable of measuring an internal temperature by using a temperature sensor and performing wireless communication with two or more different cellular networks.

BACKGROUND ART

A portable electronic device (hereinafter, an electronic device), such as a smartphone or a tablet PC, may provide various applications, and may support a cellular wireless communication function. To meet an increasing demand for wireless data traffic after wide use of a 4G Long-Term Evolution (LTE) network, a 5G New Radio (NR) network is gradually being widely implemented, and accordingly, the electronic device may include an antenna and a Radio Frequency (RF) circuit to be able to connect to both the 4G network and the 5G network.

As the electronic device is used, heat may occur, and this heat generation problem may deteriorate an operating performance of the electronic device, and may incur a safety risk. Accordingly, the electronic device provides a method for sensing a temperature in real time and controlling a certain level or higher of heat generation.

DISCLOSURE OF INVENTION

Technical Problem

When the electronic device is capable of accessing two or more different cellular networks, different wireless access technologies and required resources may exert different effects on heat generation. For example, the electronic device requires a high-bandwidth resource and an access technology, such as directional beamforming, to connect to a 5G network, which may cause the electronic device to generate greater heat than when connected to a 4G network. The electronic device may be designed to reduce heat generation by falling back to a sub-network when an internal temperature reaches a certain level. However, when the electronic device falls back to the sub-network, current consumption may increase to worsen heat generation depending on an actual RF environment.

Solution to Problem

An electronic device according to various embodiments includes: at least one temperature sensor, a communication module, and a processor. The processor is configured to measure a temperature of at least part of the electronic device by using the temperature sensor in a state of being connected to a first cellular network via the communication module, identify a first consumed current consumed through the communication module in the state being connected to the first cellular network, establish a connection to a second cellular network by using the communication module when the measured temperature exceeds a first reference value, identify a second consumed current consumed through the communication module in a state of being connected to the second cellular network, compare a first communication environment of the first cellular network with a second communication environment of the second cellular network when the second consumed current is equal to or greater than the first consumed current, and maintain the connection to the second cellular network or reestablish a connection to the first cellular network, based on a comparison of the first communication environment with the second communication environment or whether the second consumed current is less than the first consumed current.

A thermal control method of an electronic device according to various embodiments includes: measuring a temperature of at least part of the electronic device in a state of being connected to a first cellular network, identifying a first consumed current consumed through a communication module in the state being connected to the first cellular network, establishing a connection to a second cellular network when the measured temperature exceeds a first reference value, identifying a second consumed current consumed through the communication module in a state of being connected to the second cellular network, comparing a first communication environment of the first cellular network with a second communication environment of the second cellular network when the second consumed current is equal to or greater than the first consumed current, and maintaining the connection to the second cellular network or reestablishing a connection to the first cellular network, based on a comparison of the first communication environment with the second communication environment or whether the second consumed current is less than the first consumed current.

Advantageous Effects of Invention

According to various embodiments of the disclosure, it is possible to provide an electronic device and a thermal control method of an electronic device for optimizing thermal control and wireless communication performance by determining a cellular network to be accessed in view of the state of the electronic device in an RF environment.

MODE FOR THE INVENTION

Figure 1:
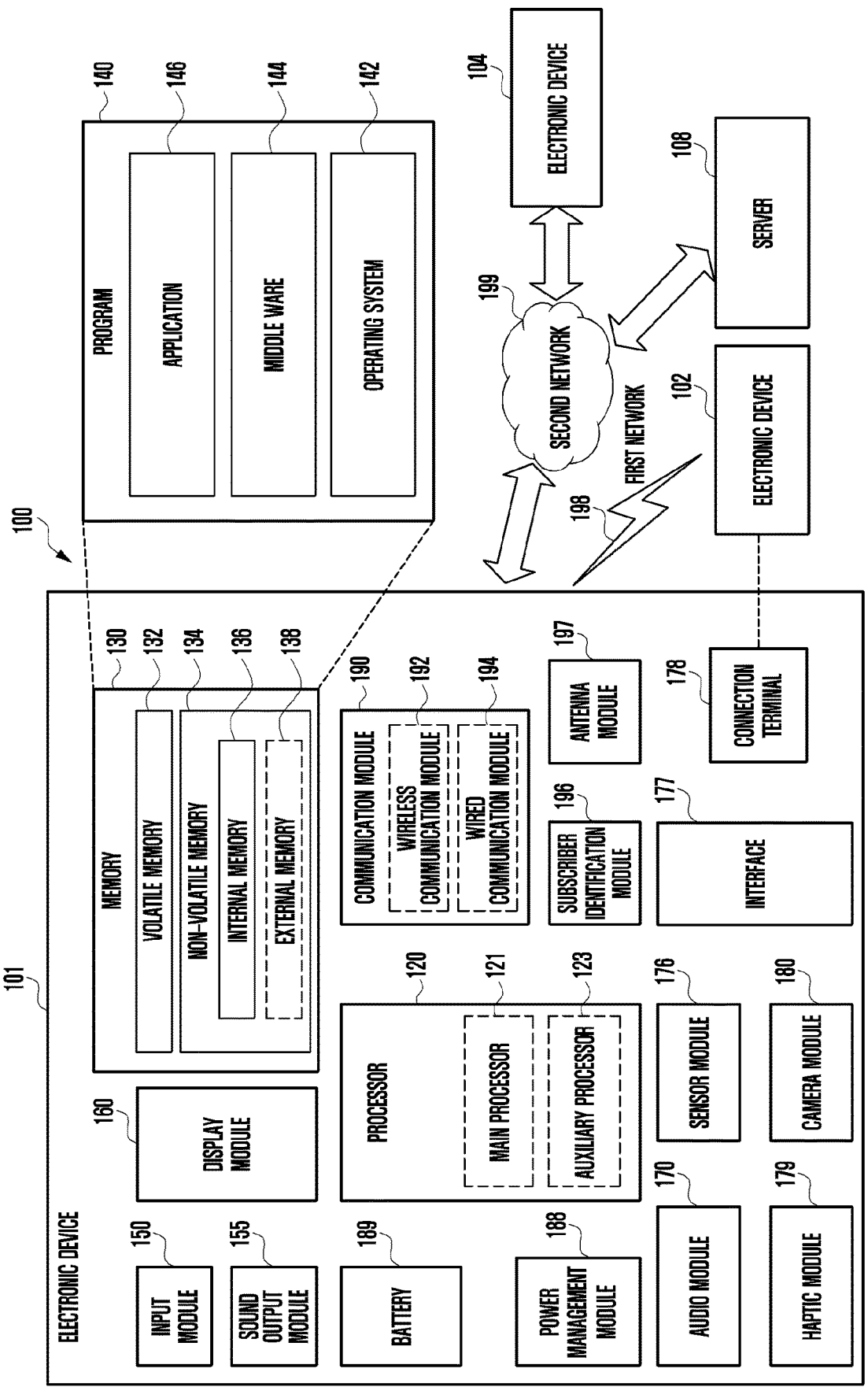
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
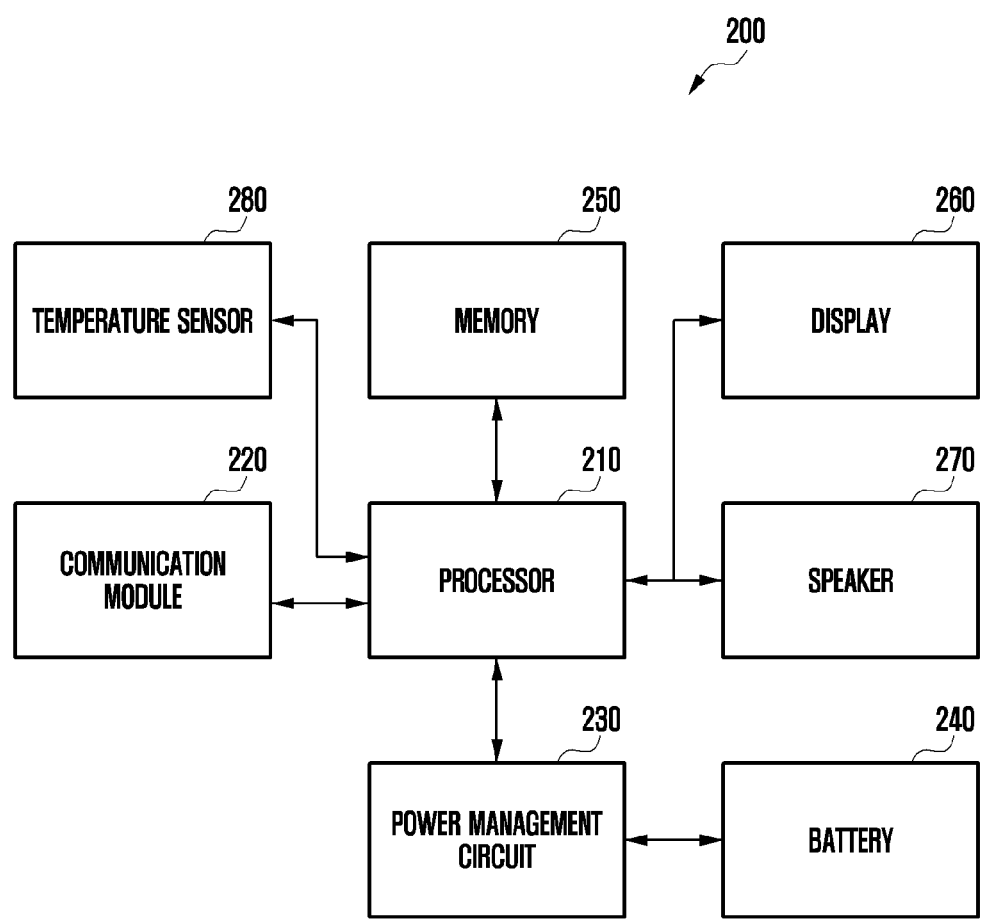
FIG. 2 is a block diagram of an electronic device according to various embodiments.

FIG. 2 is a block diagram of an electronic device 200 according to various embodiments.

Referring to FIG. 2, the electronic device 200 according to various embodiments may include a processor 210, a communication module 220, a power management circuit 230, a battery 240, a memory 250, a temperature sensor 280, a display 260, and a speaker 270. Various embodiments of the disclosure may be implemented even though at least some of the illustrated components and/or functions are omitted or substituted. The electronic device 200 may further include at least some of the components and/or functions of the electronic device 101 of FIG. 1. At least some (e.g., the processor 210, the memory 250, and the power management circuit 230) of the components of the electronic device 200 may be disposed in a housing (not shown), and at least some (e.g., the display 260 and the speaker 270) may be exposed to the outside. At least some of the components of the electronic device 200 may be operatively, electrically, and/or functionally connected to each other.

According to various embodiments, the display 260 may display an image signal provided from the processor 210. The display 260 may be configured as any one of a liquid crystal display (LCD), a light-emitting diode (LED) display, an organic light-emitting diode (OLED) display, a micro-electromechanical system (MEMS) display, or an electronic paper display, but is not limited thereto. The display 260 may include at least some of the components and/or functions of the display module of FIG. 1. The display 260 may be configured as a flexible display, a foldable display, or a slidable display.

According to various embodiments, the speaker 270 may output a sound signal to the outside of the electronic device 200. One or more speakers 270 may be disposed on an upper or lower end of the housing of the electronic device 200, but a disposition position of the speaker 270 is not limited thereto. The speaker 270 may include at least some of the components and/or functions of the audio module 170 of FIG. 1.

According to various embodiments, the battery 240 may supply power to at least one component of the electronic device 200. The battery 240 may include a rechargeable secondary cell or a fuel cell, and may be recharged according to a wired or wireless charging method. The battery 240 may include at least some of the components and/or functions of the battery 189 of FIG. 1.

According to various embodiments, the power management circuit 230 may perform a control operation to supply power of the battery 240 to a different component of the electronic device 200. The power management circuit 230 may reduce power (or current) supplied to each component, based on a control signal of the processor 210. The power management circuit 230 may include at least some of the components and/or functions of the power management module 188 of FIG. 1.

According to various embodiments, the communication module 220 may include a software and/or hardware module for wirelessly communicating with a cellular network, and may include at least some of the components and/or functions of the wireless communication module 192 of FIG. 1. For example, the communication module 220 may include an RF front-end module, and the RF front-end module may convert a baseband signal generated by a communication processor into an RF signal to be used in the cellular network, or may convert an RF signal received from a cellular network base station through an antenna into a baseband signal. The RF front-end module may include a power amplifier module (PAM), a low-noise amplifier (LNA), a plurality of switches, or the like.

According to various embodiments, the communication module 220 may support a connection to two or more cellular networks. For example, the communication module 220 may support a connection to a first cellular network (e.g., a 5G NR network) and a second cellular network (e.g., a 4G LTE network), and may switch to a connection to the second cellular network in a state of being connected to the first cellular network. According to various embodiments, although the first cellular network may be a 5G NR network and the second cellular network may be a 4G LTE network, the first cellular network and the second cellular network may be various types of next-generation networks and legacy networks, without being limited thereto.

According to various embodiments, the communication module 220 may include a plurality of RF front-end modules used for respective cellular networks or frequency bands, and the plurality of RF front-end modules may be configured as a single chip or at least a part of a package.

According to various embodiments, the electronic device 200 may include at least one temperature sensor 280. For example, the electronic device 200 may include at least one temperature sensor disposed adjacent to an internal component of the electronic device 200, such as a main PCB on which the processor 210 and the memory 250 are mounted, the battery 240, and a rear cover. The temperature sensor 280 may be mounted on the main printed circuit board (PCB), or may be mounted on a separate PCB or a flexible PCB (FPCB) to be electrically connected to the processor 210 of the main PCB. The temperature sensor 280 may be configured as a semiconductor device having an electrical characteristic changing depending on temperature, such as a thermistor.

According to various embodiments, the memory 250 may include a volatile memory and/or a non-volatile memory which are known. The memory 250 may store various instructions executable by the processor 210. The instructions may include control commands for arithmetic and logical operations, data movement, and input/output recognizable by the processor 210. The memory 250 may include at least some of the components and/or functions of the memory of FIG. 1, and may store at least part of the program of FIG. 1.

According to various embodiments, the processor 210 is a component capable of performing an operation or data processing related to control and/or communication of each component of the electronic device 200, and may include at least some of the components of the processor 120 of FIG. 1. The processor 210 may be operatively, electrically, and/or functionally connected with an internal component of the electronic device 200, such as the communication module 220, the power management circuit 230, the memory 250, the display 260, the speaker 270, and the temperature sensor 280.

According to various embodiments, although there is no restriction on operation and data processing functions implementable by the processor 210 in the electronic device 200, various embodiments for heat control of the electronic device 200 according to a temperature measured by the temperature sensor 280 are described in this document. The following operation of the processor 210 may be performed as instructions stored in the memory 250 are executed.

Hereinafter, an operation for thermal control when the temperature rises in a state of the electronic device 200 being connected to the first cellular network (e.g., 5G NR network) is described in detail.

According to various embodiments, the electronic device 200 may measure the temperature of at least part of the electronic device 200 by using the temperature sensor 280 in a state of being connected to the first cellular network. The electronic device 200 may include a plurality of temperature sensors 280, and each temperature sensor 280 may be disposed inside the electronic device 200, such as the main PCB, the battery 240, and the rear cover. The processor 210 may periodically receive a temperature value measured by each temperature sensor 280, and may monitor whether the temperature value reaches a reference value.

According to various embodiments, the processor 210 may monitor a current value consumed by each component from the power management circuit 230. For example, the processor 210 may monitor a current consumed by the communication module 220 for RF communication with the first cellular network or the second cellular network.

According to various embodiments, when the measured temperature exceeds a first reference value, the processor 210 may perform a primary improvement operation of current consumption. Here, the primary improvement operation of current consumption may include an operation of reducing current consumption of each component of the electronic device 200 while maintaining the connection to the first cellular network. For example, the processor 210 may reduce current consumption by reducing RF transmission and reception power of the communication module 220 and/or the antenna and/or by reducing a communication bandwidth. Alternatively, the processor 210 may reduce a consumed current supplied to a component, for example, the display 260 and the speaker 270, other than the communication module 220.

According to various embodiments, output power of the battery 240 may be supplied to each component by the power management circuit 230, and the processor 210 may reduce a current supplied to the communication module 220, the display 260, the speaker 270, or the like by the power management circuit 230.

According to various embodiments, when the temperature value measured by the temperature sensor 280 continues to increase and exceeds a second reference value despite reducing the current consumption according to the primary improvement operation of current consumption, the processor 210 may perform a secondary improvement operation of current consumption. Here, the secondary improvement operation of current consumption may include an operation of changing a connected cellular network.

According to an embodiment, when the temperature continues to increase and reaches the second reference value despite the primary improvement operation of current consumption, the electronic device 200 may be disconnected from the currently connected first cellular network (e.g., the 5G NR network), and may switch to the connection to the second cellular network (e.g., the 4G LTE network). In general, when connected to the 5G NR network, the electronic device 200 may consume more current than when connected to the 4G LTE network due to a high frequency band, a wide bandwidth, beamforming, and the like. When switching to the connection to the 4G LTE network as describe above, a current consumed by the communication module 220 and/or the antenna may be reduced, thus improving a heat generation state in general. However, in a certain case of an actual user experience, even when switching to the 4G LTE network, power consumption may not be reduced, thus worsening the heat generation state of the electronic device 200. For example, when communication quality of the 4G LTE network to which the electronic device 200 is connectable is inferior to communication quality of the 5G NR network, power consumption for maintaining the connection to the 4G LTE network may be greater than power consumption when connecting to the 5G NR network. Alternatively, in a situation in which the electronic device 200 attempts to maintain the same bandwidth used in the 5G NR network as in the 4G LTE network, power consumption in the switched 4G LTE network may be greater than power consumption in the switched 5G NR network.

Figure 3:
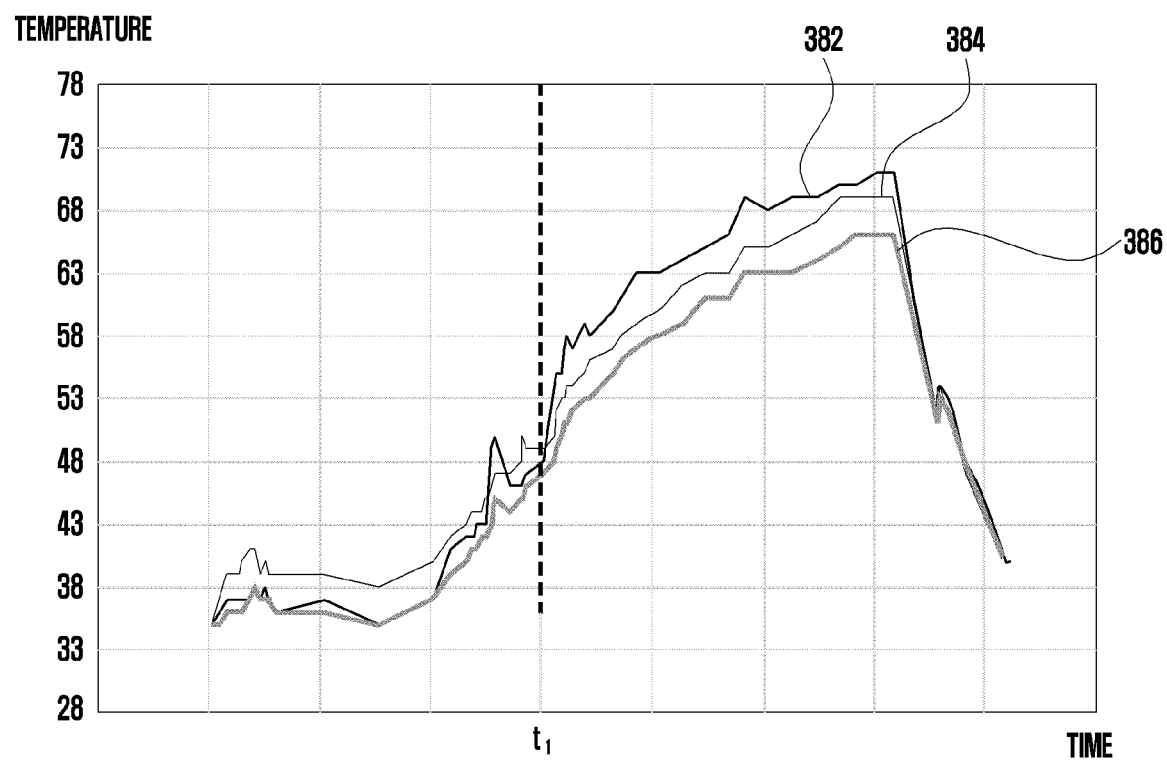
FIG. 3 is a graph illustrating a temperature measured in a cellular network switching according to various embodiments.

FIG. 3 is a graph illustrating a temperature value measured by the temperature sensor 280 of the electronic device 200 when the electronic device 200 switches from the 5G NR network to the 4G LTE network (t1). FIG. 3 shows the surface temperature of the electronic device 200, the temperature of the power amplifier (PAM) of the RF front-end module, and the temperature of the processor 210 (e.g., the communication processor), and each temperature value may be measured by the separate temperature sensor 280 disposed adjacent to each component. Referring to FIG. 3, despite switching the connection from the 5G NR network to the 4G LTE network, the surface temperature 382 of the electronic device 200, the temperature 384 of the PAM of the RF front-end module, and the temperature 386 of the processor 210 are identified as increasing.

According to various embodiments, when the temperature reaches the second reference value in the secondary improvement operation of current consumption, the electronic device 200 does not immediately switch to the connection to the second cellular network, but may identify an RF environment and an additional current consumption improvement method to operate an optimal algorithm for heat generation improvement.

According to various embodiments, when the temperature measured by the temperature sensor 280 exceeds the second reference value, the processor 210 may establish the connection to the second cellular network (e.g., the 4G LTE network) by using the communication module 220. In this situation, the processor 210 may end the connection to the previously connected first cellular network (e.g., the 5G NR network). Here, a reason for connecting to the second cellular network may be to measure a change in the RF environment when switching to the second cellular network and to identify whether switching to the second cellular network helps to improve heat generation.

According to various embodiments, the electronic device 200 may prevent a user from recognizing a network switching while temporarily switching to the second cellular network and operating the algorithm. For example, the electronic device 200 may display an icon indicating a cellular network currently connected on a status bar on the display 260, and may continue displaying an icon indicating the first cellular network while temporarily switching to the second cellular network and operating the algorithm. Subsequently, when determining to finally maintain the second cellular network as a result of performing the algorithm, the electronic device 200 may change the icon to an icon indicating the second cellular network.

According to various embodiments, the processor 210 may identify a consumed current consumed through the communication module 220 while connected to the second cellular network. The processor 210 may calculate the consumed current, based on a current value supplied from the power management circuit 230 to the communication module 220.

According to various embodiments, the processor 210 may compare a first consumed current consumed through the communication module 220 in a state of being connected to the first cellular network with a second consumed current consumed through the communication module 220 after switching to the connection to the second cellular network.

According to various embodiments, when the first consumed current is greater than the second consumed current, the processor 210 may determine to finally maintain the second cellular network, which is because current consumption is less when switching to the second cellular network, thus being advantageous in improving heat generation. Since temporarily switched to the second cellular network to measure the second consumed current while the algorithm operates, the electronic device 200 may continue to maintain the connection to the second cellular network after the determination. Further, since switched to the connection to the second cellular network, the electronic device 200 may change the icon indicating the currently connected cellular network displayed on the status bar of the display 260 to the icon indicating the second cellular network.

According to various embodiments, when the second consumed current is equal to or greater than the first consumed current, the processor 210 may compare a first communication environment of the first cellular network with a second communication environment of the second cellular network. The processor 210 may maintain the connection to the second cellular network, or may perform control to establish the connection to the first cellular network again, based on a comparison of the first communication environment and the second communication environment. The electronic device 200 may distinguish the first communication environment from the second communication environment according to a specific criterion or specific criteria, and the criterion may be a difference between transmission and reception power of the electronic device 200 in the first cellular network and transmission and reception power thereof in the second cellular network. For example, when the electronic device 200 is connected to the first cellular network to transmit and receive high-capacity data, the electronic device 200 may be allocated one channel with a 100-MHz bandwidth, but when connected to the first cellular network the electronic device 200 may need to use five channels with a 20-MHz bandwidth via carrier aggregation (CA) to maintain the 100-MHz bandwidth since in the second cellular network, a narrower bandwidth is allocable. In this case, transmission and reception power may increase when the electronic device 200 falls back to the second cellular network. Further, in case not transmitting and receiving high-capacity data as described above, the electronic device 200 at the current position may have a good communication quality in a medium or strong electric field in the first cellular network, and may have a poor communication quality in a weak electric field in the second cellular network. In this case, the electronic device 200 uses the power amplifier (PA) when amplifying an RF signal, and power consumption of the PA may increase depending on the electric field, and thus transmission power may increase when the electronic device 200 falls back to the second cellular network having the weak electric field.

According to various embodiments, when the first consumed current consumed through the communication module 220 in the state of being connected to the first cellular network is smaller than the second consumed current consumed through the communication module 220 after switching to the connection to the second cellular network, the processor 210 may identify whether there is a method for improving current consumption. For example, when the electronic device 200 is connected to a cellular network base station, the RF environment of the electronic device 200 may be changed according to a requirement transmitted from the base station to maintain the connection. For example, when the electronic device 200 is located in an area where radio signal strength is weak in the 4G cellular network, the base station may request the electronic device 200 to increase transmission and reception power to maintain the connection. In this condition, the electronic device 200 may identify whether there is a method for improving current consumption, such as adjusting an RF transmission and reception current, in relation to the current RF environment.

According to various embodiments, when the first consumed current consumed through the communication module 220 in the state of being connected to the first cellular network is smaller than the second consumed current consumed through the communication module 220 after switching to the connection to the second cellular network, the processor 210 may determine a thermal control method according to the RF environment of the electronic device 200 and whether there is a method for improving an RF transmission and reception current.

According to an embodiment, when the communication environment of the second cellular network is superior to the first communication environment of the first cellular network, that is, when an increase in current consumption when connected to the second cellular network is not due to an RF environment (e.g., the weak electric field) of the second cellular network, the processor 210 may switch to the connection to the second cellular network. In this case, since the increase in current consumption is not due to an increase in RF transmission and reception current according to the RF environment, the increase in current consumption when connected to the second cellular network may be due to a circuit or process other than that for RF transmission and reception. In this case, the processor 210 may reduce a current supplied to a component (e.g., the main chip including the processor 210, the display 260, and the speaker 270) other than the communication module 220.

According to an embodiment, when the communication environment of the second cellular network is worse than the first communication environment of the first cellular network, that is, when the increase in current consumption is due to the poor RF environment of the second cellular network, the processor 210 may identify whether there is a method for improving an RF transmission and reception current while maintaining the connection to the second cellular network. When there is a method for improving an RF transmission and reception current (e.g., when it is possible to reduce the gain of the PAM or LAN of the RF front-end module, when it is possible to switch the connection to the second cellular network from multi-input and multi-output (MIMO) to single-input and single-output (SISO), or when it is possible to reduce the bandwidth), the processor 210 may switch to the connection to the second cellular network. In this case, the processor 210 may perform communication with the second cellular network by applying the identified method for improving the RF transmission and reception current.

According to an embodiment, in a situation in which the communication environment of the second cellular network is worse than the first communication environment of the first cellular network, when there is no method for improving an RF transmission and reception current while maintaining the connection to the second cellular network, the processor 210 may reestablish the connection to the first cellular network again rather than maintaining the connection to the second cellular network. In this case, the processor 210 may reduce the current supplied to the component (e.g., the main chip including the processor 210, the display 260, and the speaker 270) other than the communication module 220.

Figure 4:
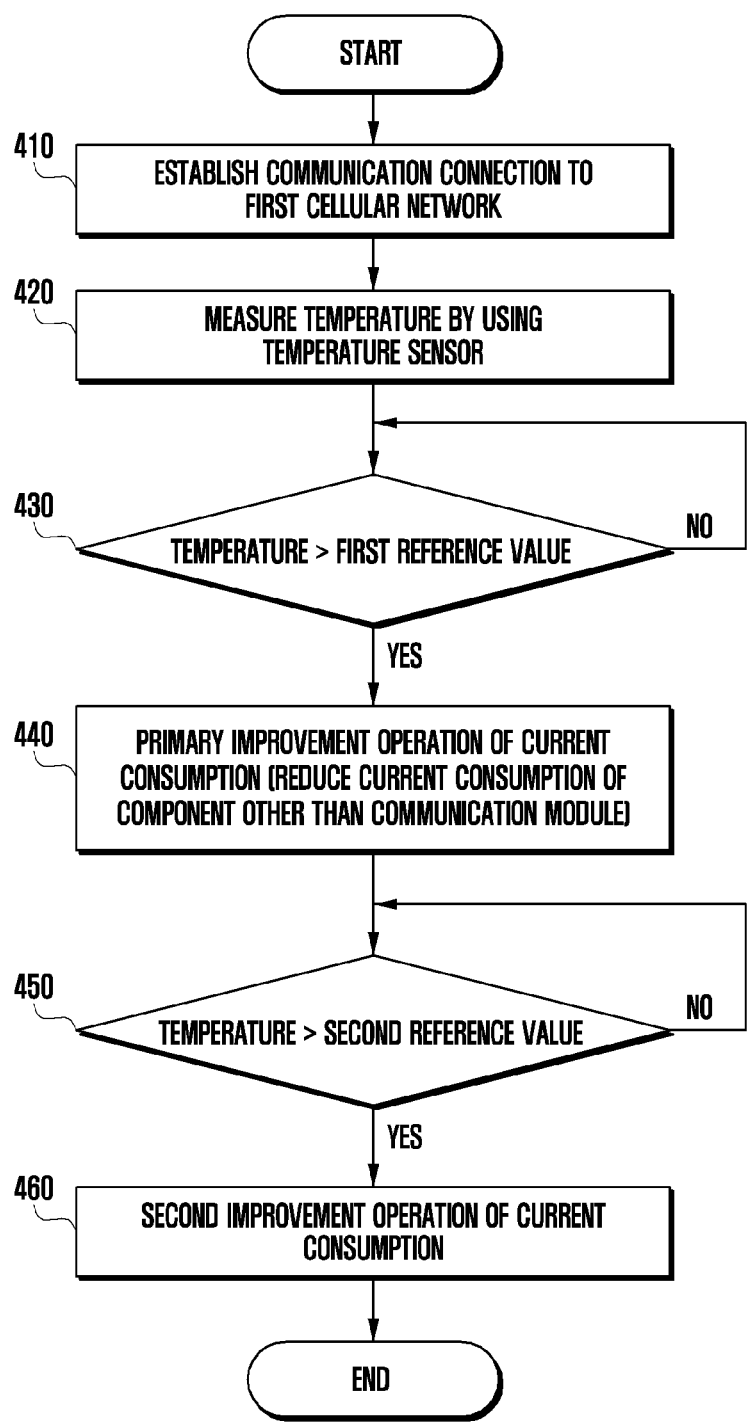
FIG. 4 is a flowchart illustrating a thermal control method of an electronic device according to various embodiments.

FIG. 4 is a flowchart illustrating a thermal control method of an electronic device according to various embodiments.

The illustrated method may be performed by the electronic device (e.g., the electronic device 200 of FIG. 2) described with reference to FIG. 1 to FIG. 3, and a description of technical features described above is omitted hereinafter.

According to various embodiments, in operation 410, the electronic device may establish a communication connection to a first cellular network. For example, the first cellular network may be a 5G NR network, and a second cellular network may be a 4G LTE network.

According to various embodiments, in operation 420, the electronic device may measure the temperature of at least part of the electronic device by using a temperature sensor. The electronic device may include a plurality of temperature sensors, and each temperature sensor may be disposed inside the electronic device, such as a main PCB, a battery, and a rear cover. The electronic device may compare the average of temperature values measured by the plurality of temperature sensors with a reference value, or may compare the highest temperature or a temperature measured by a determined temperature sensor according to a use state with the reference value. Although FIG. 4 shows that operation 420 is performed after operation 410, the disclosure is not limited thereto, and the electronic device may measure the temperature by using the temperature sensor even when not connected to the first cellular network.

According to various embodiments, in operation 430, the electronic device may identify whether the measured temperature exceeds a first reference value. When the measured temperature exceeds the first reference value, the electronic device may perform a primary improvement operation of current consumption in operation 440. Here, the primary improvement operation of current consumption may include an operation of reducing current consumption of each component of the electronic device while maintaining the connection to the first cellular network. For example, the electronic device may reduce current consumption by reducing RF transmission and reception power of a communication module and/or an antenna and/or by reducing a communication bandwidth. Alternatively, the electronic device may reduce a consumed current supplied to a component, for example, the display and the speaker, other than the communication module. As a result of identification in operation 430, when the temperature is less than or equal to the first reference value, the electronic device may continuously monitor whether the temperature exceeds the first reference value rather than performing the current consumption improvement operation.

According to various embodiments, in operation 450, the electronic device may identify whether the temperature exceeds a second reference value after performing the primary improvement operation of current consumption. The second reference value may be a higher temperature value than the first reference value.

According to various embodiments, when the measured temperature exceeds the second reference value, the electronic device may perform a secondary improvement operation of current consumption in operation 460. The secondary improvement operation of current consumption is described in detail with reference to FIG. 5. As a result of identification in operation 450, when the temperature is less than or equal to the second reference value, the electronic device may continuously monitor whether the temperature exceeds the second reference value while continuing to perform the current primary improvement operation of current consumption.

Figure 5:
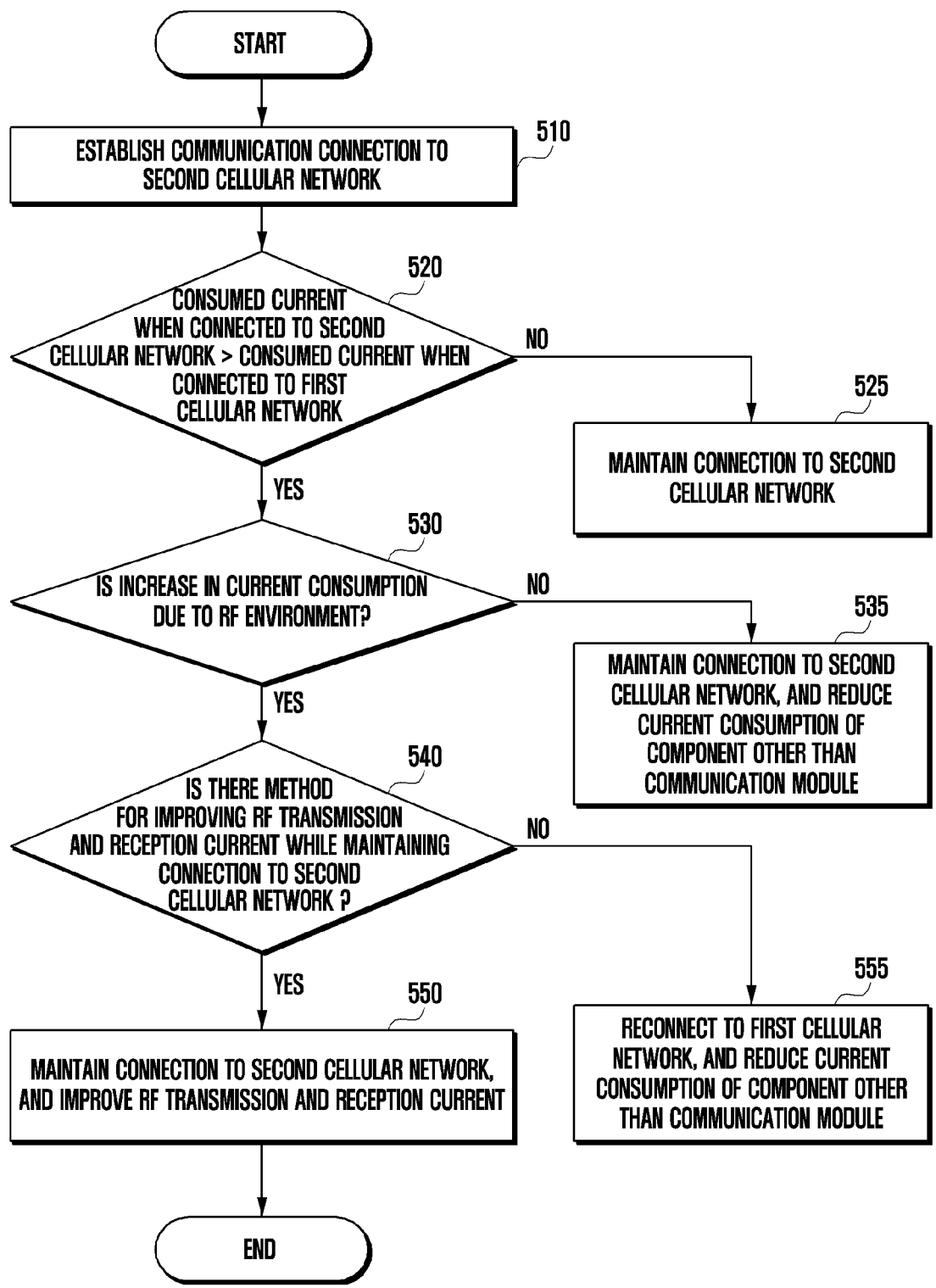
FIG. 5 is a flowchart illustrating a thermal control method of an electronic device according to various embodiments.

FIG. 5 is a flowchart illustrating a thermal control method of an electronic device according to various embodiments.

FIG. 5 illustrates the secondary improvement operation of current consumption 460 of FIG. 4, and a description of the technical features described above is omitted hereinafter.

According to various embodiments, in operation 510, when the temperature measured through the temperature sensor exceeds the second reference value, the electronic device may be disconnected from the currently connected first cellular network (e.g., the 5G NR network), and may connect to the second cellular network (e.g., the 4G LTE network). Here, since a switch to a connection to the second cellular network is for measuring a consumed current and an RF environment, the electronic device may prevent a user from recognizing the network switching. For example, the electronic device may continue displaying an icon indicating the first cellular network while temporarily switching to the second cellular network and operating an algorithm. The electronic device may switch to the connection to the second cellular network, and may then measure a second consumed current consumed through the communication module.

Figure 6A:
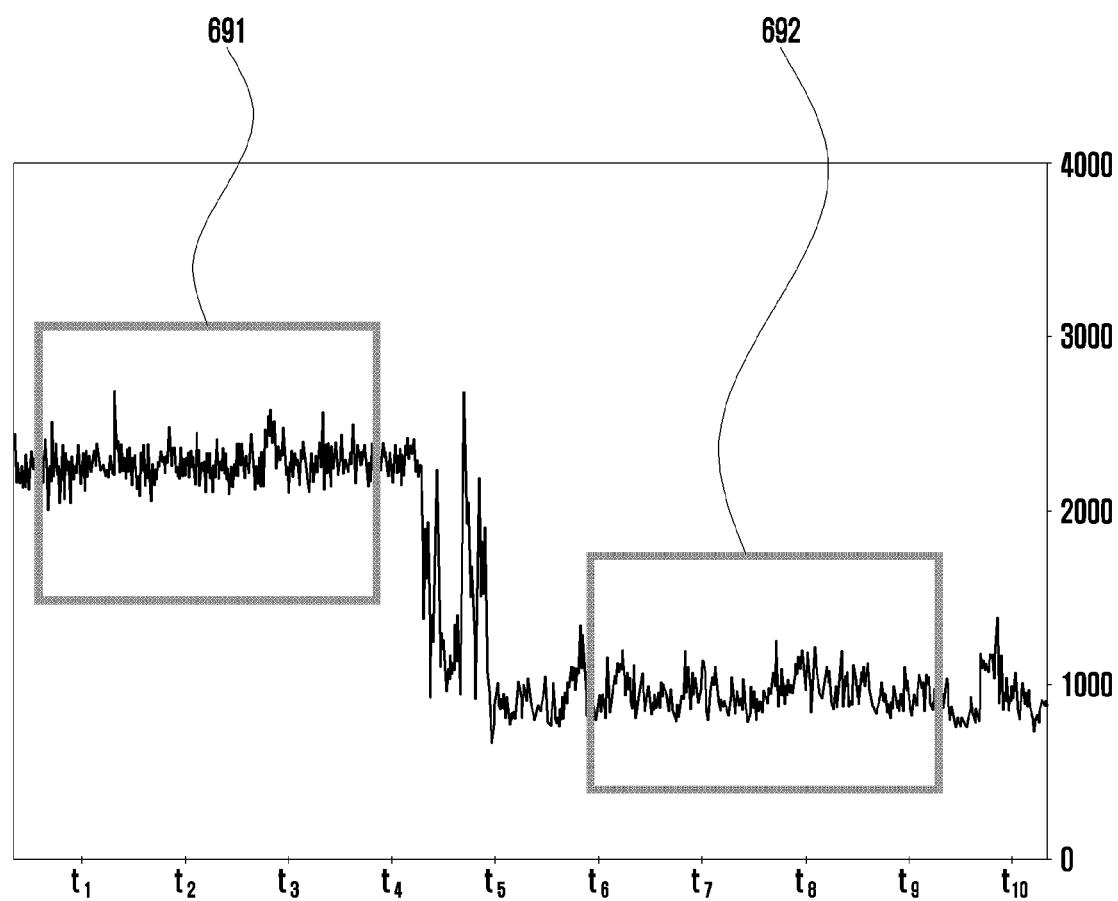
FIG. 6A and FIG. 6B are graphs illustrating a consumed current measured in a cellular network switching according to various embodiments.
Figure 6B:
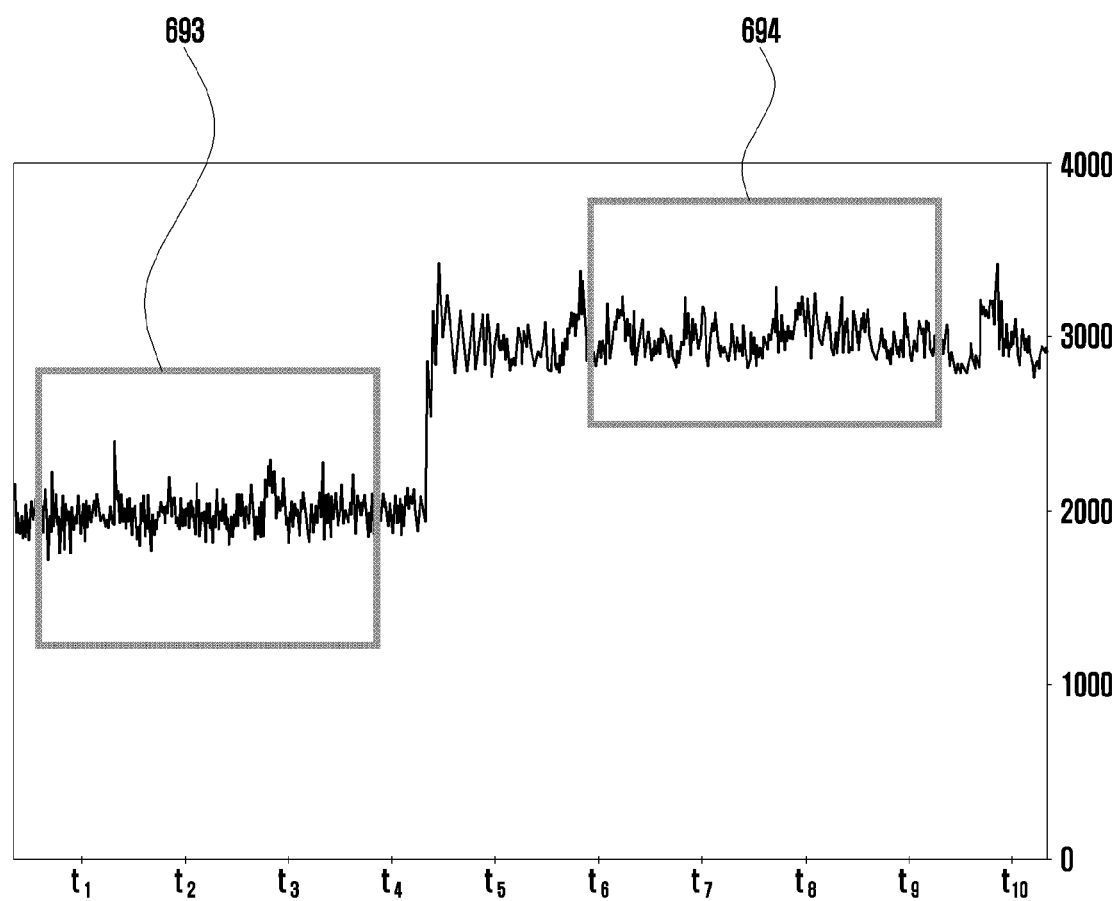

According to various embodiments, in operation 520, the electronic device may compare a first consumed current 691 consumed through the communication module in a state of being connected to the first cellular network with the second consumed current 692 consumed through the communication module after switching to the connection to the second cellular network. For example, the electronic device may monitor a consumed current consumed through the communication module from an output value of a power management circuit. Referring to FIG. 6A, a consumed current consumed through the communication module may decrease after switching from the first cellular network to the second cellular network, and thus a second consumed current 692 may be reduced compared to a first consumed current 691. In contrast, referring to FIG. 6B, a consumed current consumed through the communication module may increase after switching from the first cellular network to the second cellular network, and thus a second consumed current 694 may be increased compared to a first consumed current 693. In FIG. 6B, since a communication environment of the second cellular network is not excellent, the consumed current may be further increased.

According to various embodiments, when the second consumed current is less than or equal to the first consumed current (e.g., FIG. 6A), the electronic device may maintain the switch to the connection to the second cellular network in operation 525. In this case, since the consumed current is reduced as the electronic device is connected to the second cellular network and the temperature is reduced accordingly, the electronic device may be connected to the second cellular network to perform communication. According to an embodiment, since it is determined to finally maintain the connection to the second cellular network, the electronic device may change an icon indicating a currently connected cellular network displayed on a status bar of the display to an icon indicating the second cellular network.

According to various embodiments, when the second consumed current is greater than the first consumed current (e.g., FIG. 6B), the electronic device may identify whether an increase in current consumption is due to an RF environment in operation 530. The electronic device may compare a first communication environment of the first cellular network and a second communication environment of the second cellular network. For example, the electronic device may compare the first communication environment and the second communication environment by using a wireless communication parameter, such as a frequency band, a communication bandwidth, the number of channels, the number of antennas, and an electric field.

According to various embodiments, when the increase in current consumption is not due to the RF environment, for example, when the second communication environment is superior to the first communication environment, the electronic device may maintain the connection to the second cellular network, and may reduce the current consumption of the component other than the communication module in operation 535. In this case, since the increase in current consumption is not due to an increase in RF transmission and reception current according to the RF environment, the increase in current consumption may be due to a circuit or process other than that for RF transmission and reception. Accordingly, the electronic device may reduce the current supplied to the component (e.g., the main chip including the processor 210, the display 260, and the speaker 270) other than the communication module 220.

According to an embodiment, the electronic device may compare current consumption due to RF transmission and reception with current consumption due to the circuit or process other than the RF transmission and reception, and may reduce a current supplied to a component having high current consumption.

According to various embodiments, when the increase in current consumption is determined as being due to the RF environment, for example, when the second communication environment is worse than the first communication environment, the electronic device may identify whether there is a method for improving the RF transmission and reception current while maintaining the connection to the second cellular network in operation 540.

According to various embodiments, when there is a method for improving the RF transmission and reception current while maintaining the connection to the second cellular network, the electronic device may maintain the connection to the second cellular network, and may improve the RF transmission and reception current in operation 550. For example, the electronic device may reduce the RF transmission and reception current by reducing the gain of the PAM or LAN of the RF front-end module while maintaining the connection to the second cellular network, by switching the connection to the second cellular network from multi-input and multi-output (MIMO) to single-input and single-output (SISO), or by reducing the bandwidth.

According to an embodiment, the electronic device may perform at least some of a reduction of the gain of the PAM or LAN of the RF front-end module, a switch of the connection to the second cellular network to single-input and single-output (SISO), or a reduction of the bandwidth, based on the amount of data required by the user and/or during an application operation while maintaining the connection to the second cellular network.

According to various embodiments, when there is no method for improving the RF transmission and reception current while maintaining the connection to the second cellular network, the electronic device may connect back to the first cellular network, and may reduce the current consumption of the component other than the communication module in operation 555. For example, the electronic device may reduce the current supplied to the main chip including the processor 210, the display 260, the speaker 270, or the like.

According to various embodiments, operations 525, 535, and 555 for improving the current consumption may be sequentially performed, or at least some thereof may be performed simultaneously, and the order thereof may be changed.

An electronic device 200 according to various embodiments may include at least one temperature sensor 280, a communication module 220, and a processor 210, wherein the processor 210 may be configured to measure a temperature of at least part of the electronic device 200 by using the temperature sensor 280 in a state of being connected to a first cellular network (e.g., a 5G NR network) via the communication module 220, identify a first consumed current consumed through the communication module 220 in the state of being connected to the first cellular network, establish a connection to a second cellular network (e.g., a 4G LTE network) by using the communication module 220 when the measured temperature exceeds a first reference value, identify a second consumed current consumed through the communication module 220 in a state of being connected to the second cellular network, compare a first communication environment of the first cellular network with a second communication environment of the second cellular network when the second consumed current is equal to or greater than the first consumed current, and maintain the connection to the second cellular network or reestablish a connection to the first cellular network, based on a comparison of the first communication environment with the second communication environment or whether the second consumed current is less than the first consumed current. As used herein, "state of being connected to a cellular network" means a state in which an RF communication with the cellular network is performed.

According to various embodiments, the processor 210 may be configured to maintain the connection to the second cellular network and to reduce a current supplied to a circuit of the electronic device 200 other than the communication module 220 when the second communication environment is superior to the first communication environment.

According to various embodiments, the electronic device may further include a display and a speaker, where the processor 210 may be configured to reduce a current supplied to at least one of the display, the speaker, or a main chip including the processor 210 when the second communication environment is superior to the first communication environment.

According to various embodiments, the processor 210 may be configured to identify whether it is possible to reduce an RF transmission and reception current of the communication module 220 while maintaining the connection to the second cellular network when the first communication environment is superior to the second communication environment.

According to various embodiments, the processor 210 may be configured to maintain the connection to the second cellular network and to reduce the RF transmission and reception current of the communication module 220 when it is possible to reduce the transmission and reception current of the communication module 220 while maintaining the connection to the second cellular network.

According to various embodiments, the processor 210 may be configured to reduce a current supplied to a power amplifier (PAM) or a low-noise amplifier (LNA) of the communication module 220 in order to reduce the RF transmission and reception current.

According to various embodiments, the processor 210 may be configured to reestablish the connection to the first cellular network and to reduce a current supplied to a circuit of the electronic device 200 other than the communication module 220 when it is impossible to reduce the transmission and reception current of the communication module 220 while maintaining the connection to the second cellular network.

According to various embodiments, the processor 210 may be configured to maintain the connection to the second cellular network when the second consumed current is less than the first consumed current.

According to various embodiments, the processor 210 may be configured to reduce a current supplied to a circuit of the electronic device 200 other than the communication module 220 while maintaining the connection to the first cellular network when the measured temperature exceeds a second reference value lower than the first reference value before reaching the first reference value in the state of being connected to the first cellular network.

According to various embodiments, the electronic device may further include a battery; and a power management circuit configured to control a current supplied to each circuit of the electronic device 200 from the battery, the processor 210 may be configured to identify the first consumed current and the second consumed current from a current output from the power management circuit to the communication module 220.

According to various embodiments, the first cellular network may be a 5G NR network, and the second cellular network may be a 4G LTE network.

A thermal control method of an electronic device 200 according to various embodiments may include measuring a temperature of at least part of the electronic device 200 in a state of being connected to a first cellular network, identifying a first consumed current consumed through a communication module 220 in the state of being connected to the first cellular network, establishing a connection to a second cellular network when the measured temperature exceeds a first reference value, identifying a second consumed current consumed through the communication module 220 in a state of being connected to the second cellular network, comparing a first communication environment of the first cellular network with a second communication environment of the second cellular network when the second consumed current is equal to or greater than the first consumed current, and maintaining the connection to the second cellular network or reestablishing a connection to the first cellular network, based on a comparison of the first communication environment with the second communication environment or whether the second consumed current is less than the first consumed current.

According to various embodiments, the method may further include maintaining the connection to the second cellular network and reducing a current supplied to a circuit of the electronic device 200 other than the communication module 220 when the second communication environment is superior to the first communication environment.

According to various embodiments, the method may further include reducing a current supplied to at least one of a display, a speaker, or a main chip of the electronic device 200 when the second communication environment is superior to the first communication environment.

According to various embodiments, the method may further include identifying whether it is possible to reduce an RF transmission and reception current of the communication module 220 while maintaining the connection to the second cellular network when the first communication environment is superior to the second communication environment.

According to various embodiments, the method may further include maintaining the connection to the second cellular network and reducing the RF transmission and reception current of the communication module 220 when it is possible to reduce the transmission and reception current of the communication module 220 while maintaining the connection to the second cellular network.

According to various embodiments, the method may further include reestablishing the connection to the first cellular network and reducing a current supplied to a circuit of the electronic device 200 other than the communication module 220 when it is impossible to reduce the transmission and reception current of the communication module 220 while maintaining the connection to the second cellular network.

According to various embodiments, the method may further include maintaining the connection to the second cellular network when the second consumed current is less than the first consumed current.

According to various embodiments, the method may further include reducing a current supplied to a circuit of the electronic device 200 other than the communication module 220 while maintaining the connection to the first cellular network when the measured temperature exceeds a second reference value lower than the first reference value before reaching the first reference value in the state of being connected to the first cellular network.

According to various embodiments, the first cellular network may be a 5G NR network, and the second cellular network may be a 4G LTE network.

The invention claimed is:
1. An electronic device comprising:
at least one temperature sensor;
memory storing a plurality of instructions;
a communication circuitry; and
at least one processor including one or more processing circuitry,
wherein the plurality of instructions executable by the at least one processor, individually or collectively, cause the electronic device to:
measure a temperature of at least part of the electronic device by using the temperature sensor in a state of being connected to a first cellular network via the communication circuitry;
identify a first consumed current consumed through the communication circuitry in the state of being connected to the first cellular network;
establish a connection to a second cellular network by using the communication circuitry in a state that the measured temperature exceeds a first reference value;
identify a second consumed current consumed through the communication circuitry in a state of being connected to the second cellular network;
in a state that the second consumed current is greater than the first consumed current:
when an increase in current consumption is identified as due to a radio frequency (RF) environment, control a current supplied to the communication circuitry corresponding to the second cellular network to reduce the current consumption while maintaining the connection to the second cellular network;
when the increase in current consumption is not due to the RF environment, control a current supplied to at least one of a display, a speaker, or the at least processor of the electronic device to reduce the current consumption while maintaining the connection to the second cellular network.

2. The electronic device of claim 1, wherein the plurality of instructions executable by the at least one processor, individually or collectively, cause the electronic device to, identify whether it is possible to reduce a Radio Frequency (RF) transmission and reception current of the communication circuitry while maintaining the connection to the second cellular network in a state that the first communication environment is superior to the second communication environment.

3. The electronic device of claim 2, wherein the plurality of instructions executable by the at least one processor, individually or collectively, cause the electronic device to, maintain the connection to the second cellular network and to reduce the RF transmission and reception current of the communication circuitry in a state that it is possible to reduce the transmission and reception current of the communication circuitry while maintaining the connection to the second cellular network.

4. The electronic device of claim 3, wherein the plurality of instructions executable by the at least one processor, individually or collectively, cause the electronic device to reduce a current supplied to a power amplifier (PAM) or a low-noise amplifier (LNA) of the communication circuitry in order to reduce the RF transmission and reception current.

5. The electronic device of claim 2, wherein the processor is configured to reestablish the connection to the first cellular network and to reduce a current supplied to a circuit of the electronic device other than the communication circuitry in a state that it is impossible to reduce the transmission and reception current of the communication circuitry while maintaining the connection to the second cellular network.

6. The electronic device of claim 1, wherein the processor is configured to maintain the connection to the second cellular network, in a state that the second consumed current is less than the first consumed current.

7. The electronic device of claim 1, wherein the plurality of instructions executable by the at least one processor, individually or collectively, cause the electronic device to reduce a current supplied to a circuit of the electronic device other than the communication circuitry while maintaining the connection to the first cellular network in a state that the measured temperature exceeds a second reference value lower than the first reference value before the measured temperature exceeds the first reference value.

8. The electronic device of claim 1, further comprising:
a battery; and
a power management circuit configured to control a current supplied to each circuit of the electronic device from the battery,
wherein the plurality of instructions executable by the at least one processor, individually or collectively, cause the electronic device to identify the first consumed current and the second consumed current from a current output from the power management circuit to the communication circuitry.

9. The electronic device of claim 1, wherein the first cellular network is a 5G New Radio (NR) network, and the second cellular network is a 4G Long-Term Evolution (LTE) network.

10. A thermal control method of an electronic device, the method comprising:

measuring a temperature of at least part of the electronic device in a state of being connected to a first cellular network;
identifying a first consumed current consumed through a communication circuitry in the state of being connected to the first cellular network;
establishing a connection to a second cellular network in a state that the measured temperature exceeds a first reference value;
identifying a second consumed current consumed through the communication circuitry in a state of being connected to the second cellular network;
in a state that the second consumed current is greater than the first consumed current:
when an increase in current consumption is identified as due to a radio frequency (RF) environment, control a current supplied to the communication circuitry corresponding to the second cellular network to reduce the current consumption while maintaining the connection to the second cellular network;
when the increase in current consumption is not due to the RF environment, control a current supplied to at least one of a display, a speaker, or the at least processor of the electronic device to reduce the current consumption while maintaining the connection to the second cellular network.

11. The method of claim 10, further comprising maintaining the connection to the second cellular network and reducing a current supplied to a circuit of the electronic device other than the communication circuitry in a state that the second communication environment is superior to the first communication environment.

12. The method of claim 10, further comprising identifying whether it is possible to reduce an RF transmission and reception current of the communication circuitry while maintaining the connection to the second cellular network in a state that the first communication environment is superior to the second communication environment.

13. The method of claim 12, further comprising maintaining the connection to the second cellular network and reducing the RF transmission and reception current of the communication circuitry in a state that it is possible to reduce the transmission and reception current of the communication circuitry while maintaining the connection to the second cellular network.

14. The method of claim 12, further comprising reestablishing the connection to the first cellular network and reducing a current supplied to a circuit of the electronic device other than the communication circuitry in a state that it is impossible to reduce the transmission and reception current of the communication circuitry while maintaining the connection to the second cellular network.

15. The method of claim 10, further comprising maintaining the connection to the second cellular network in a state that the second consumed current is less than the first consumed current.

16. The method of claim 10, further comprising reducing a current supplied to a circuit of the electronic device other than the communication circuitry while maintaining the connection to the first cellular network in a state that the measured temperature exceeds a second reference value lower than the first reference value before reaching the first reference value in the state of being connected to the first cellular network.

17. The method of claim 10, wherein the first cellular network is a 5G NR network and the second cellular network is a 4G LTE network.

\* \* \* \* \*